(12) United States Patent
Jung et al.

(10) Patent No.: US 11,064,212 B2
(45) Date of Patent: Jul. 13, 2021

(54) METHOD AND DEVICE FOR CODING AND DECODING A MULTI-VIEW SEQUENCE

(71) Applicant: Orange, Issy-les-Moulineaux (FR)

(72) Inventors: Joel Jung, Chatillon (FR); Antoine Dricot, Chatillon (FR); Marco Cagnazzo, Gif sur Yvette (FR); Beatrice Pesquet-Popescu, Bailly Romainvilliers (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/461,155

(22) PCT Filed: Nov. 13, 2017

(86) PCT No.: PCT/FR2017/053091
§ 371 (c)(1),
(2) Date: May 15, 2019

(87) PCT Pub. No.: WO2018/091812
PCT Pub. Date: May 24, 2018

(65) Prior Publication Data
US 2019/0281317 A1    Sep. 12, 2019

(30) Foreign Application Priority Data
Nov. 15, 2016   (FR) .................................. 1661027

(51) Int. Cl.
*H04N 19/44*     (2014.01)
*H04N 19/105*    (2014.01)
(Continued)

(52) U.S. Cl.
CPC ........... *H04N 19/44* (2014.11); *H04N 19/105* (2014.11); *H04N 19/137* (2014.11);
(Continued)

(58) Field of Classification Search
CPC .. H04N 13/161; H04N 13/349; H04N 13/282; H04N 19/597
See application file for complete search history.

(56) References Cited

U.S. PATENT DOCUMENTS

2013/0243103 A1* 9/2013 Sasaki ................... H04N 13/00
                                                                375/240.25
2015/0341663 A1* 11/2015 Zhang .................. H04N 19/105
                                                                375/240.16

OTHER PUBLICATIONS

Dai Wei et al: 11 Merge Frame Design for Video Stream Switching Using Piecewise Constant Functions, IEEE Transact! ons on Image Processing, IEEE Service Center. Piscataway, NJ, US, vol. 25, No. 8, Aug. 1, 2016 (Aug. 1, 2016), pp. 3489-3504, XP011614102.

(Continued)

*Primary Examiner* — Clifford Hilaire
(74) *Attorney, Agent, or Firm* — David D. Brush; Westman, Champlin & Koehler, P.A.

(57) ABSTRACT

A method for decoding a coded data stream representing a video having a first view and a second view different from the first view, in which a reference image of the second view is previously reconstructed. For a current block of a current image of the first view, a motion information item associated with the current block representative of a displacement of the current block in the previously reconstructed reference image, is obtained. A prediction block is obtained based on the previously reconstructed reference image of the second view and of the obtained motion information item. The current block is reconstructed based on the prediction block, a prediction residual information item decoded based on the coded data stream and a difference information item calculated between a first block associated with the first view and a second block associated with the second view and decoded based on the coded data stream.

14 Claims, 6 Drawing Sheets

Figure 4A:
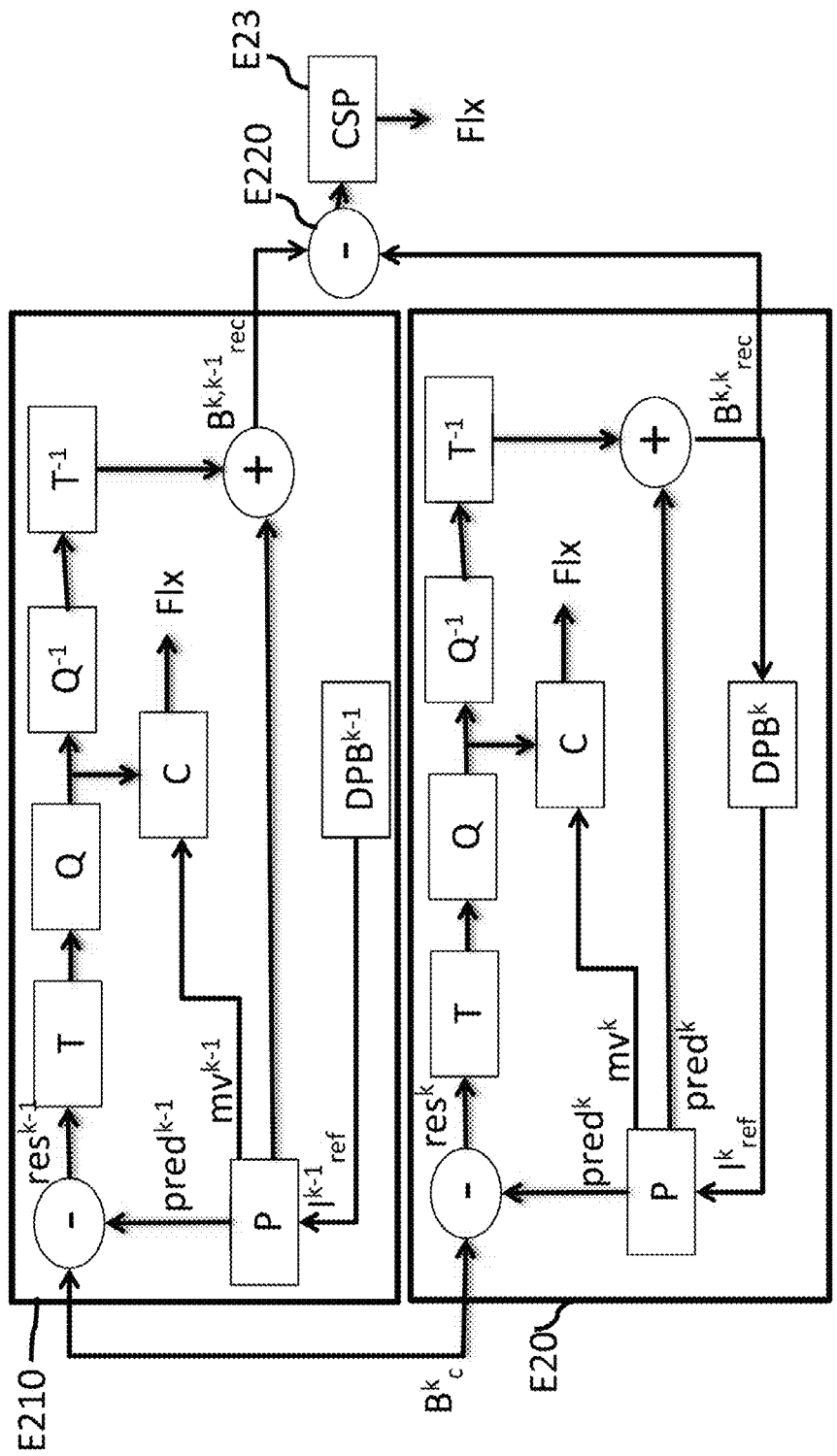

(51) Int. Cl.

| | |
|---|---|
| *H04N 19/137* | (2014.01) |
| *H04N 19/176* | (2014.01) |
| *H04N 19/172* | (2014.01) |
| *H04N 19/162* | (2014.01) |
| *H04N 19/597* | (2014.01) |
| *H04N 19/46* | (2014.01) |
| *H04N 21/218* | (2011.01) |
| *H04N 13/161* | (2018.01) |

(52) U.S. Cl.
CPC ......... *H04N 19/162* (2014.11); *H04N 19/172* (2014.11); *H04N 19/176* (2014.11); *H04N 19/46* (2014.11); *H04N 19/597* (2014.11); *H04N 13/161* (2018.05); *H04N 21/21805* (2013.01)

(56) References Cited

OTHER PUBLICATIONS

Yanwei Liu et al: "Low-delay View Random Access for Multi-view Video Coding", Circuits and Systems, 2007. ISCAS 2007. IEEE International Symposium 0 N, IEEE, PI, May 1, 2007 (May 1, 2007), pp. 997-1000, XP031181431.

Ngai -Man Cheung et al: "Distributed Source Coding Application to Low-Delay Free Viewpoint Switching in Multiview Video Compression (Abstract)", 26. Picture Coding Symposium; Jul. 11, 2007-Sep. 11, 2007; Lisbon, , Nov. 7, 2007 (Nov. 7, 2007), XP030080396.

Xun Guo et al: "Free viewpoint switching in multi-view video streaming using Wyner-Ziv video coding", SPIE—International Society for Optical Engineering. Proceedings, vol. 6077, Jan. 15, 2006 (Jan. 15, 2006), p. 60770U, XP055385242.

Ling Zhu et al: "Inter-view-predicted redundant pictures for viewpoint switching in multiview video streaming", Acoustics Speech and Signal Processing (ICASSP), 2010 IEEE International Conference on, IEEE, Piscataway, NJ, USA, Mar. 14, 2010 (Mar. 14, 2010), pp. 746-749, XP031696999.

Ki-Kit Lai et al: "Viewpoint switching in multiview videos using SP-frames", 15th IEEE International Conference on Image Processing : ICIP 2008 ; San Diego, California, USA. Oct. 12-15, 2008, IEEE, Piscataway, NJ, USA, Oct. 12, 2008 (Oct. 12, 2008), pp. 1776-1779, XP031374367.

International Search report dated Jan. 25, 2018 for corresponding International Application No. PCT/FR2017/053091, filed Nov. 13, 2017.

Written Opinion of the International Searching Authority dated May 24, 2018 for corresponding International Applicatio No. PCT/FR2017/053091, filed Nov. 13, 2017.

* cited by examiner

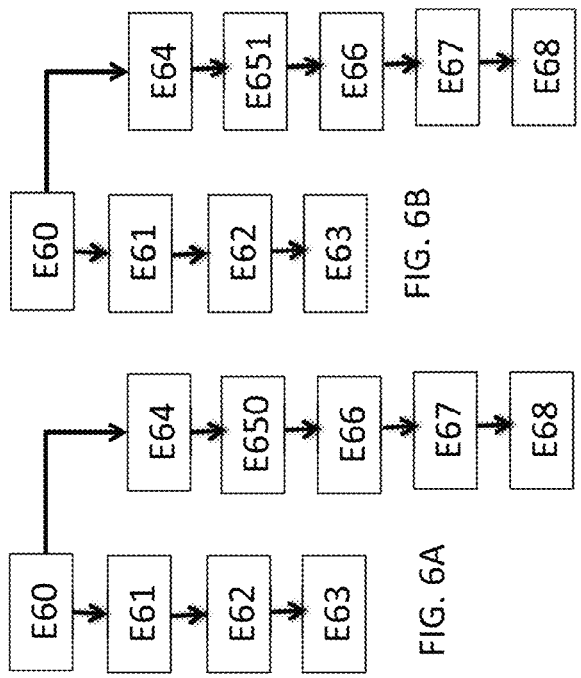
FIG. 6B
FIG. 6A
FIG. 5A
FIG. 5B
FIG. 5C
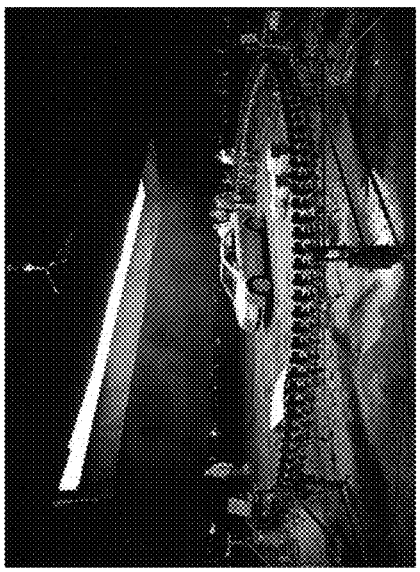
FIG. 1

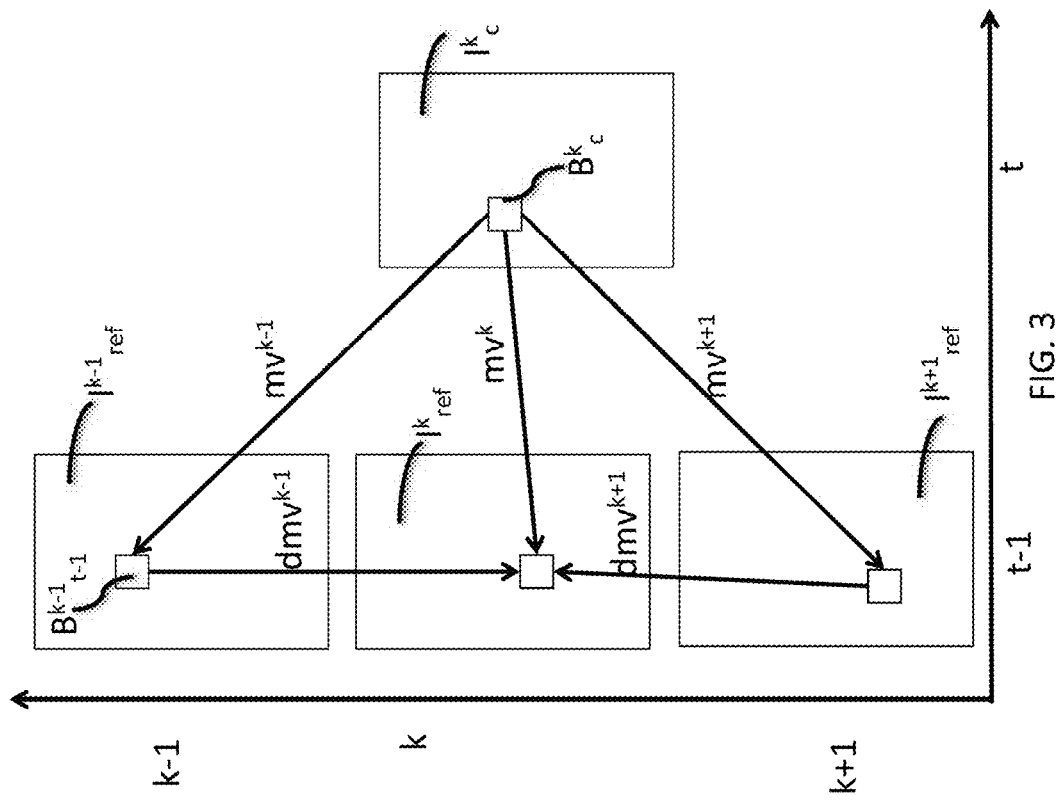
FIG. 3
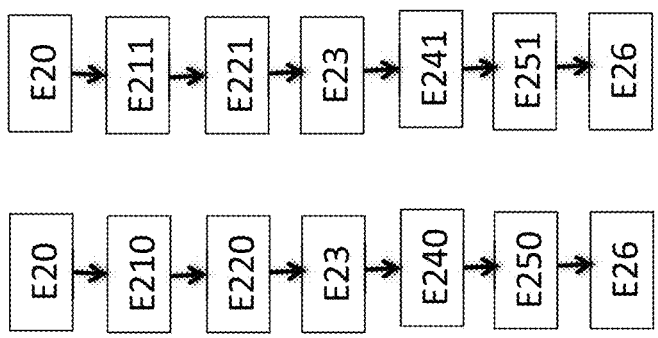
FIG. 2B
FIG. 2A

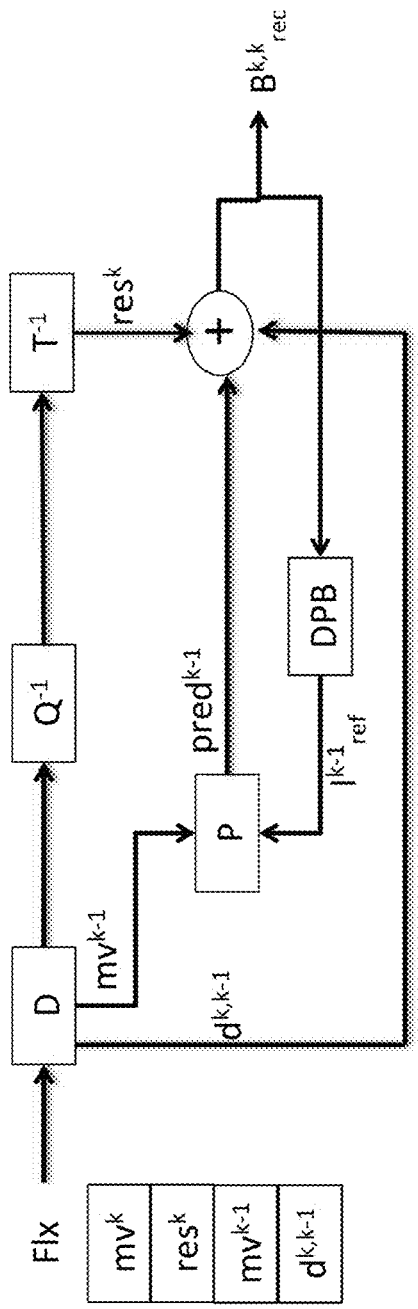
FIG. 7C
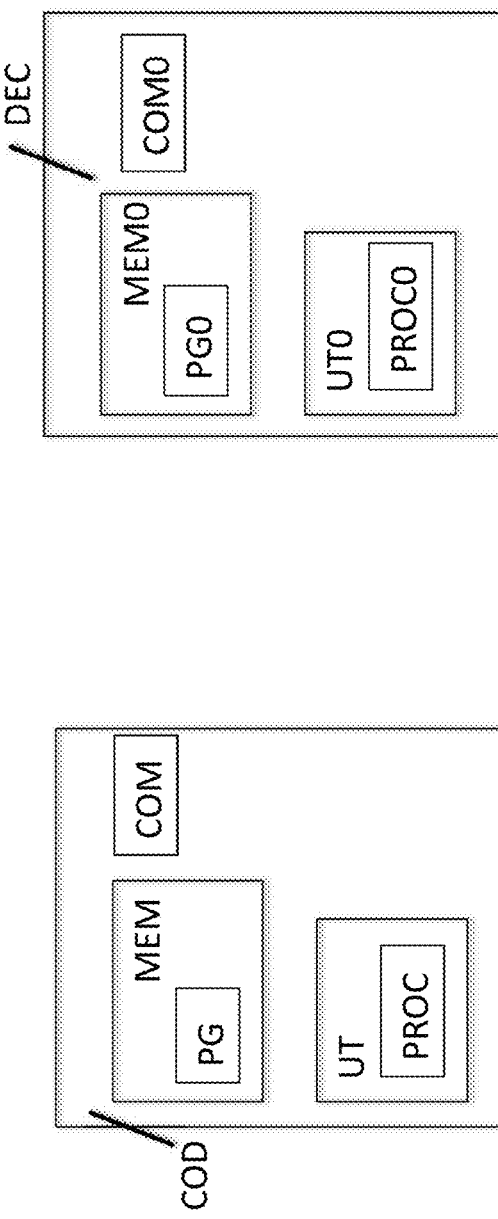
FIG. 8
FIG. 9

US 11,064,212 B2

METHOD AND DEVICE FOR CODING AND DECODING A MULTI-VIEW SEQUENCE

CROSS-REFERENCE TO RELATED APPLICATIONS

This Application is a Section 371 National Stage Application of International Application No. PCT/FR2017/053091, filed Nov. 13, 2017, the content of which is incorporated herein by reference in its entirety, and published as WO 2018/091812 A1 on May 24, 2018, not in English.

1. FIELD OF THE INVENTION

The present invention pertains generally to the field of the processing of 3D images, and more precisely to the coding and to the decoding of sequences of multi-view images, in the case of free navigation within a sequence of multi-view images.

2. PRIOR ART

FIG. 1 presents an example of a device for acquiring a sequence of multi-view images, or multi-view video sequence representative of a 3D scene. Such a device comprises a set of cameras positioned so that each of the cameras acquires an image sequence representative of a view of the scene. When the number of views is large, for example greater than 10, one speaks of super-multi-view image sequence.

Each image sequence, commonly called a view, acquired by one of the cameras of the device can be coded in a data stream.

The set of views or image sequences acquired by the cameras of the device forms a multi-view video or super-multi-view video, in which it is possible to navigate freely during playback of the video along the view axis and/or along the time axis as a function of the views requested by a user. Such a functionality is also known by the name "Free Navigation" in English.

Indeed, starting from an initially displayed current view, it is possible to scan while the video is running, across images of a view to the left or to the right of a current view as requested by the user, the displayed view then becoming the current view. The user can stop the video running and scan across the images of the various views corresponding to the instant at which running was stopped.

In order to ensure efficiency in terms of compression, the coding of the views exploits temporal correlations between the images of one and the same view and inter-view correlations. Thus, to decode a view at a temporal instant, it may be necessary to decode several views. For example, a 3D video coder such as the 3D-HEVC standard exploits the temporal and inter-view correlations to have a good coding efficiency. However, such a standard requires the systematic decoding of the whole set of views. Such a coder is therefore not suitably adapted for the functionality of free navigation in a super-multi-view video.

Indeed, in order to limit the complexity of decoding for the playback device, for example a tablet, a mobile telephone or other, it is necessary to limit the number of views, i.e. of sequences of images, to be decoded at each instant during playback.

A drawback is that, during coding, the scan paths to be followed when viewing are unknown since the scanning of the views over time of the video is left free to the user. This imposes strong constraints for the coder and the decoder. Indeed, out of N views coded by a coder, only some of them will be displayed to the user.

A simple solution for offering the functionality of free navigation in the video while limiting the number of views to be decoded consists in coding each image of each view with the aid of a coder of still images, such as JPEG, JPEG 2000, or to apply an Intra coding with the aid of a video coder such as H.264. However, such a solution is expensive in terms of bitrate of the encoded video. It is therefore preferable to use a video coder using a temporal prediction of the images of each view so as to have a good coding cost/decoding complexity compromise.

Certain systems use a dialog between a server and the terminal of the user in order to predict the views which will be requested by the user, in particular as a function of the displacements of the user along the time axis and the view axis. However, such systems require real-time communication with the server and suitable resources adapted at the level of the server.

It is known from the H.264 video standard to code images termed "SI frames" and "SP frames" making it possible to reconstruct one and the same image on the basis of a reference image different from the reference image used on coding. Such a technique makes it possible to go from one video stream to another video stream, for example in the case of an adaptation of the video transmission bitrate. However, such a technique does not allow the insertion of images of change of stream except at regular intervals over time for fear of greatly penalizing the video coding cost. Such a technique is therefore not adapted to code a multi-view video while offering a free navigation functionality, i.e. offering the possibility of changing view at any instant of the video.

3. DISCLOSURE OF THE INVENTION

The invention seeks to improve the prior art.

It relates to a method for decoding a coded data stream representative of a video comprising at least one first view and one second view different from the first view, implemented by a decoding device. The decoding device comprises a memory comprising at least one previously reconstructed reference image of the second view. According to the invention, the decoding method comprises, for at least one block of a current image of the first view, termed the current block:

obtaining, on the basis at least of the coded data stream, of a motion information item associated with said current block, said motion information item being representative of a displacement of said current block in said previously reconstructed reference image, decoding, on the basis of the coded data stream, of a prediction residual information item, decoding, on the basis of the coded data stream, of a difference information item calculated between a first block associated with the first view and a second block associated with the second view, obtaining of a prediction block on the basis of said previously reconstructed reference image of said second view and of said motion information item obtained, reconstruction of said current block on the basis of the prediction block, of said prediction residual information item and of said decoded difference information item.

According to the invention, a current image of a first view can be reconstructed at the decoder irrespective of the reference image available at the decoder. Stated otherwise, irrespective of the view previously decoded by the decoder, an image of another view, the first view, can be reconstructed in an identical manner to when the reference image available at the decoder is a reference image of the first view.

Such a decoding method affords the advantage of offering a free navigation functionality while offering a good compromise between decoding complexity and compression efficiency of the coder. Indeed, such a decoding method makes it possible to obtain compression performance superior to that of an intra coding of the set of images of the multi-view video.

Moreover, the complexity on decoding is reduced. The decoding method according to the invention requires the decoding of just a single view at each instant of the video.

The coding and the decoding of a multi-view video offering the functionality of free navigation are simple. Indeed, each view is coded in a conventional manner by temporal prediction, then additional information items of change of view representative of a difference between two views pairwise, are coded by inter-view prediction so as to reduce their coding cost.

The various embodiments or characteristics of embodiment mentioned hereinafter can be added independently or in combination with one another, to the characteristics of the above-defined decoding method.

According to a particular embodiment of the invention, said prediction residual information item corresponds to a residual obtained on the basis of the motion information item associated with said current block and of said previously reconstructed reference image of said second view.

Thus, according to this particular embodiment of the invention, the difference information item calculated between the first block associated with the first view and the second block associated with the second view corresponds to a difference between the block of the current image of the first view, reconstructed on the basis of a reference image of the first view, and the block of the current image of the first view, reconstructed on the basis of a reference image of the second view.

According to another particular embodiment of the invention, said prediction residual information item corresponds to a residual obtained on the basis of a motion information item representative of a displacement of said current block in a reference image of the first view and of said reference image of said first view.

Thus, according to this particular embodiment of the invention, the difference information item calculated between the first block associated with the first view and the second block associated with the second view corresponds to a difference between a first prediction block obtained for said current block by prediction on the basis of a reference image of the first view and a second prediction block obtained for said current block by prediction on the basis of a reference image of the second view.

According to this particular embodiment of the invention, the bitrate necessary to transmit the difference information item calculated between the first block associated with the first view and the second block associated with the second view is reduced.

According to another particular embodiment of the invention, the obtaining of said prediction block further comprises a step of inverse quantization of a block obtained on the basis of said motion information item obtained and of said previously reconstructed reference image of said second view.

Thus, according to this particular embodiment of the invention, the difference information item calculated between the first block associated with the first view and the second block associated with the second view corresponds to a difference between said first and second prediction blocks which have been previously quantized. Thus, the quantity of data of the information item representative of the difference between the first view and the second view is again reduced.

According to another particular embodiment of the invention, the reconstruction of said at least one block of said current image of the first view on the basis of said prediction block, of said prediction residual information item and of said difference information item calculated between the first block associated with the first view and the second block associated with the second view comprises the application of a function to said prediction block and to said information item regarding difference between the first view and the second view.

Thus, according to this particular embodiment of the invention, by choosing an appropriate function, the quantity of data of the information item regarding difference between the first view and the second view is reduced.

According to another particular embodiment of the invention, the decoding method further comprises the decoding of an information item representative of said function.

According to this particular embodiment of the invention, the function to be applied on decoding can thus be adapted as a function of the content of the video sequence or of the views between which the difference information item is calculated.

Thus, the function to be applied can be optimized at the level of the encoder so as to reduce the cost of the information item regarding difference between the first view and the second view.

According to another particular embodiment of the invention, the first view is a previous or following view of the second view according to a predetermined position of the views in the video.

According to this particular embodiment of the invention, it is necessary to transmit an information item representative of a difference between two views and fields of inter-view motion only for consecutive views according to the position of the views in the video. Thus, it suffices to code an information item representative of a difference and the fields of corresponding motion between a current view and the view to the left of the current view, and between the current view and the view to the right of the current view. Thus, the quantity of additional information items (difference information item, motion information item) is decreased, while preserving the free navigation functionality.

Indeed, the views to the left, respectively to the right, situated beyond the view to the left of the current view, respectively situated beyond the view to the right of the current view, will be able to be reconstructed by successive reconstruction of the intermediate views on the basis of the current view. According to this particular embodiment, an intermediate view can be reconstructed at each temporal instant.

According to another particular embodiment of the invention, the obtaining of said motion information item associated with said current block comprises:

the decoding of a first motion information item representative of a displacement in the previously reconstructed reference image of the second view of a reference block of said current block, said reference block corresponding to said current block displaced in a reference image of the first view, the decoding of a second motion information item representative of a displacement of said current block in said reference image of the first view, the addition of the first and of the second motion information item.

This particular embodiment of the invention makes it possible to reduce the cost of coding of the motion estimated by reference to the reference image of the second view.

According to another aspect, the invention also relates to a device for decoding a coded data stream representative of a video comprising at least one first view and one second view different from the first view, comprising a memory comprising at least one previously reconstructed reference image of the second view. According to the invention, such a decoding device is configured to, for at least one block of a current image of the first view, termed the current block:

obtain, on the basis at least of the coded data stream, a motion information item associated with said current block, said motion information item being representative of a displacement of said current block in said previously reconstructed reference image, decode, on the basis of the coded data stream, a prediction residual information item, decode, on the basis of the coded data stream, a difference information item calculated between a first block associated with the first view and a second block associated with the second view, obtain a prediction block on the basis of said previously reconstructed reference image of said second view and of said motion information item obtained, reconstruct said current block on the basis of the prediction block, of said prediction residual information item and of said decoded difference information item.

According to a particular embodiment of the invention, such a decoding device is included in a terminal.

According to another aspect, the invention also relates to a method for coding a video comprising at least one first view and one second view different from the first view. Such a coding method comprises, for at least one block of a current image of said first view, termed the current block:

coding of said current block by reference to a previously coded-decoded image of the first view, delivering a first motion information item representative of a displacement of said current block in the previously coded-decoded image of the first view and a prediction residual information item, coding of said current block by reference to a previously coded-decoded image of the second view, delivering at least one second motion information item representative of a displacement of said current block in the previously coded-decoded image of the second view, obtaining of a difference information item calculated between a first block associated with the first view and a second block associated with the second view, on the basis at least of the first motion information item and of the second motion information item, coding without loss of said difference information item calculated between the first block associated with the first view and the second block associated with the second view.

The coding method according to the invention thus allows the decoder to reconstruct a current image of the first view even when a previously reconstructed reference image of the first view is not available at the decoder. The coding method according to the invention thus makes it possible to reconstruct a current image of the first view on the basis of a previously reconstructed reference image of the second view.

The various embodiments or characteristics of embodiment mentioned hereinafter can be added independently or in combination with one another, to the characteristics of the above-defined coding method.

According to a particular embodiment of the invention, the first block associated with the first view corresponds to said current block reconstructed on the basis of the previously coded-decoded image of the first view and the second block associated with the second view corresponds to said current block reconstructed on the basis of the previously coded-decoded image of the second view.

According to another particular embodiment of the invention, the first block associated with the first view corresponds to a prediction block of the first view, obtained on the basis of the previously coded-decoded reference image of the first view and of the first motion information item, and the second block associated with the second view corresponds to a prediction block of the second view, obtained on the basis of the previously coded-decoded reference image of the second view and of the second motion information item.

According to another particular embodiment of the invention, the obtaining of said difference information item calculated between the first block associated with the first view and the second block associated with the second view comprises a step of quantization of said prediction block of the first view and of said prediction block of the second view.

According to another particular embodiment of the invention, the obtaining of said difference information item calculated between the first block associated with the first view and the second block associated with the second view comprises the application of a function to said prediction block of said first view and to said prediction block of said second view.

According to another particular embodiment of the invention, there is undertaken a coding of an information item representative of said function.

According to another particular embodiment of the invention, the second view is a previous or following view of the first view according to a predetermined position of the views in the video.

According to another particular embodiment of the invention, said difference information item calculated between the first block associated with the first view and the second block associated with the second view is obtained by selecting a mode from among the following modes, as a function of a bitrate-distortion criterion:

coding of a signal representative of a difference between the block associated with the first view and the block associated with the second view, coding of a signal representative of a difference between said block associated with the second view and said block associated with the first view, said coding method comprising the coding of an information item representative of the mode selected.

According to another particular embodiment of the invention, the coding of said second motion information item associated with said current block comprises:

the calculation of a motion residual corresponding to the difference between said second motion information item and said first motion information item, said motion residual being representative of a displacement in the previously coded-decoded image of the second view of a reference block of said current block, said reference block corresponding to said current block displaced in said previously coded-decoded image of the first view, the coding of said motion residual.

According to another aspect, the invention also relates to a device for coding a video comprising at least one first view and one second view different from the first view.

According to the invention, the coding device is configured to, for at least one block of a current image of said first view, termed the current block:

code said current block by reference to a previously coded-decoded image of the first view, delivering a first motion information item representative of a displacement of said current block in the previously coded-decoded image of the first view and a prediction residual information item, code said current block by reference to a previously coded-decoded image of the second view, delivering at least one second motion information item representative of a displacement of said current block in the previously coded-decoded image of the second view, obtain a difference information item calculated between a first block associated with the first view and a second block associated with the second view, on the basis at least of the first motion information item and of the second motion information item, code without loss said difference information item calculated between the first block associated with the first view and the second block associated with the second view.

According to a particular embodiment of the invention, such a coding device is included in a terminal or a server.

The invention also relates to a coded data stream representative of a video comprising at least one first view and one second view different from the first view. Such a coded data stream comprises, for at least one block of a current image of said first view, termed the current block, at least:

a first motion information item representative of a displacement of said current block in a reference image of the first view, a prediction residual information item, a second motion information item representative of a displacement of said current block in a reference image of the second view, a difference information item calculated between a first block associated with the first view and a second block associated with the second view, obtained on the basis at least of the first motion information item and of the second motion information item, said difference information item being coded without loss. According to a particular embodiment of the invention, the decoding method, respectively the coding method, is implemented by a computer program. The invention also relates to a computer program comprising instructions for the implementation of the decoding method or of the coding method according to any one of the particular embodiments described previously, when said program is executed by a processor. Such a program can use any programming language. It can be downloaded from a communication network and/or recorded on a medium readable by computer. This program can use any programming language, and be in the form of source code, object code, or of code intermediate between source code and object code, such as in a partially compiled form, or in any other desirable form.

The invention also envisages a recording medium or information medium readable by a computer, and comprising instructions of a computer program such as is mentioned hereinabove. The recording mediums mentioned hereinabove can be any entity or device capable of storing the program. For example, the medium can comprise a storage means, such as a ROM, for example a CD ROM or a microelectronic circuit ROM, or else a magnetic recording means, for example a diskette (floppy disk in English) or a hard disk. Moreover, the recording mediums can correspond to a transmissible medium such as an electrical or optical signal, which can be conveyed via an electrical or optical cable, by radio or by other means. The program according to the invention can in particular be downloaded over a network of Internet type. Alternatively, the recording mediums can correspond to an integrated circuit in which the program is incorporated, the circuit being adapted to execute or to be used in the execution of the methods in question.

4. LIST OF FIGURES

Figure 4B:
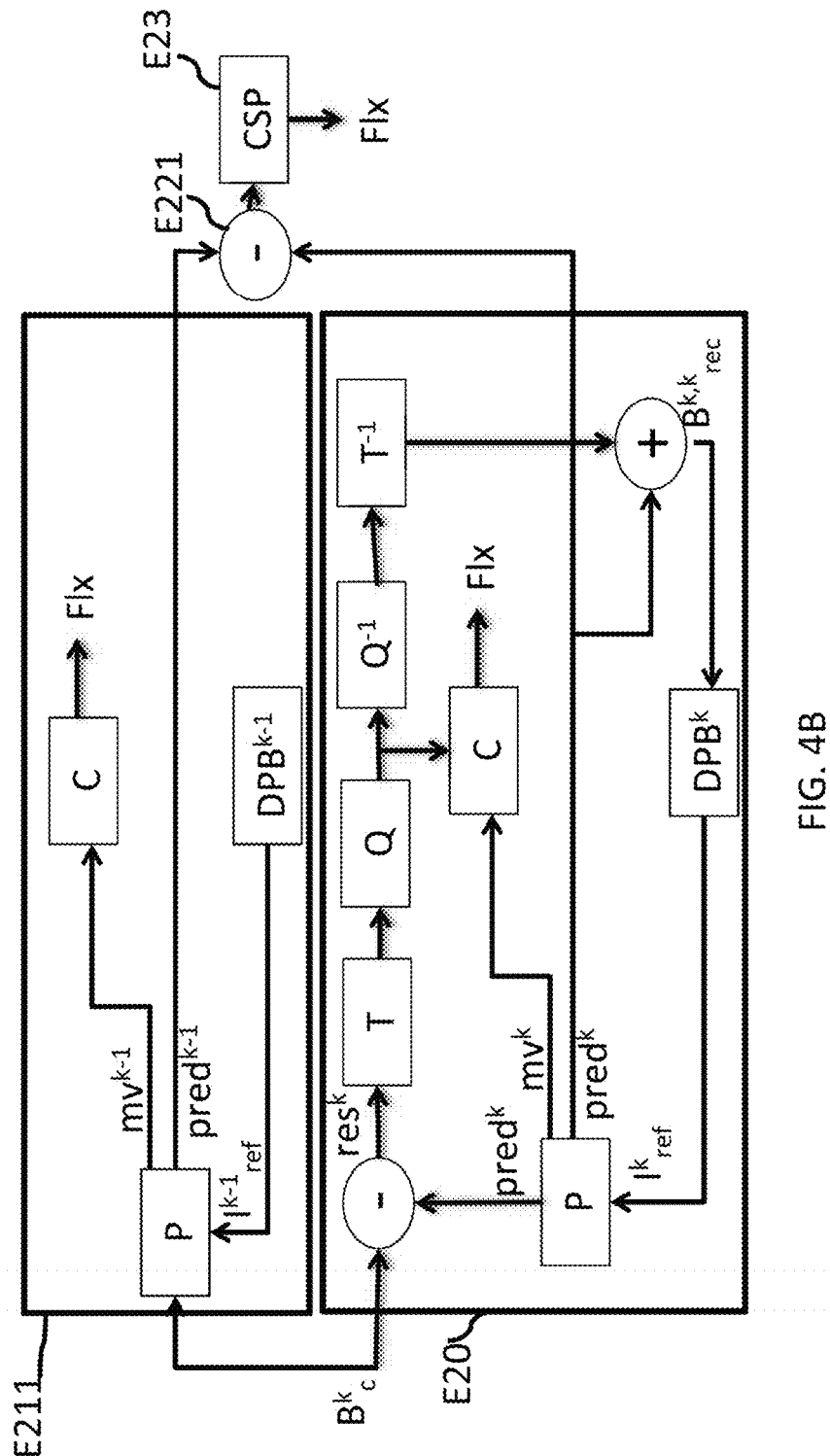
Figure 7A:
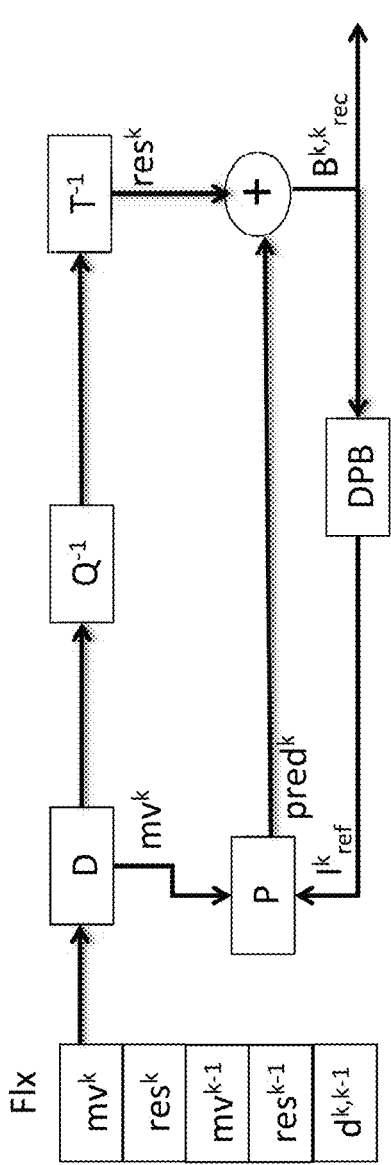
Figure 7B:
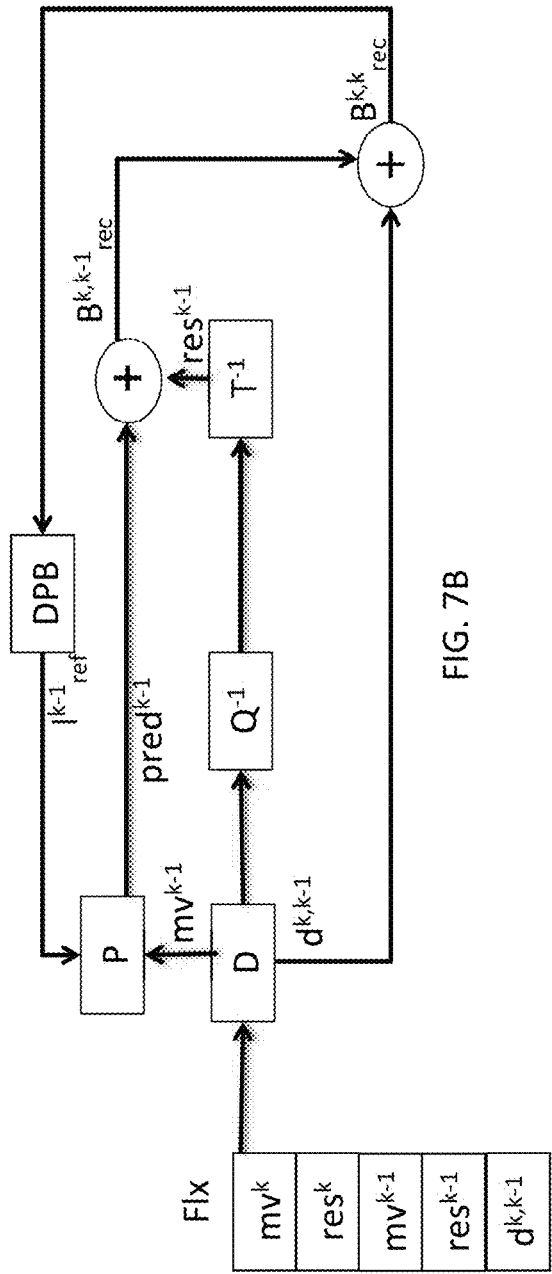

Other characteristics and advantages of the invention will become more clearly apparent on reading the following description of a particular embodiment, given by way of simple illustrative and nonlimiting example, and of the appended drawings, among which:

FIG. 1 presents an example of a device for acquiring a sequence of multi-view images;

FIGS. 2A and 2B illustrate a method for coding a sequence of multi-view images according to particular embodiments of the invention, FIG. 3 illustrates images of a multi-view sequence according to a central view (k), a view to the right (k+1) and a view to the left (k−1) of the central view, FIGS. 4A and 4B illustrate in greater detail particular embodiments of the coding method according to the invention, FIGS. 5A, 5B and 5C illustrate a coded data stream representative of a multi-view video sequence according to various particular embodiments of the invention, FIGS. 6A and 6B illustrate a method for decoding a sequence of multi-view images according to particular embodiments of the invention, FIGS. 7A, 7B and 7C illustrate in greater detail particular embodiments of the decoding method according to the invention, FIG. 8 presents the simplified structure of a device for coding a multi-view video, FIG. 9 presents the simplified structure of a device for decoding a coded data stream representative of a multi-view video.

5. DESCRIPTION OF AN EMBODIMENT OF THE INVENTION

5.1 General Principle

The coding method and the decoding method according to the invention are aimed at offering a functionality of free navigation in a multi-view video while minimizing the complexity of decoding of the multi-view video sequence. A multi-view video sequence of N views comprises N sequences of images, each sequence of images being acquired simultaneously by a camera positioned in a scene, for example according to the device illustrated in FIG. 1.

In order to offer a functionality of free navigation in a multi-view video while limiting the complexity on decoding, each view, stated otherwise each sequence of images, is coded in a conventional manner with the aid of temporal prediction, i.e. inter-image prediction. Additional information items are coded in the stream making it possible to change view during playback. These additional information items make it possible to reconstruct an image of a view of the video in an identical manner irrespective of the reference image contained in the DPB (Decoded Picture Buffer in English) of the decoder. Thus, with reference to FIG. 3, if the image reconstructed at t−1 is an image of a view k−1 (denoted $I^{k-1}_{ref}$ in FIG. 3) situated to the left of a view k requested by the user at the instant t, the image $I^k_c$ of the view k reconstructed at the instant t will be reconstructed on the basis of the image $I^{k-1}_{ref}$ reconstructed at t−1 of the current view k−1. The image $I^k_c$ of the view k reconstructed at the instant t will be identical irrespective of the reference image included in the DPB of the decoder: $I^{k-1}_{ref}$, $I^k_{ref}$, $I^{k+1}_{ref}$.

Thus, the image $I^k_c$ of the view k reconstructed at the instant t on the basis of the image reconstructed at t−1 of the view k−1 will be identical to the image which would have been reconstructed if the user had not changed view between t−1 and t and the image reconstructed at t−1 was the image of the view k, or else to the image which would have been reconstructed if the user had changed view between t−1 and t while coming from the view situated to the right (view k+1) of the view k.

The coding and decoding methods are described hereinafter in the case where the image $I^k_c$ of the view k can be reconstructed with respect to any reference image from among 3 views k, k−1 and k+1. Such coding and decoding methods according to the invention also apply to the case where the number of reference images is greater than 3, for example a reference image of a view k+2, or more generally, of a view j, j being an integer lying between 0 and N−1, N being the number of views of the video sequence.

5.2 Implementation Examples

The methods described hereinbelow make it possible to code and decode a view k and additional information items making it possible on decoding to reconstruct an image of the view k on the basis of a previously reconstructed image of a view k−1 to the left of the view k, and to reconstruct an image of the view k on the basis of a previously reconstructed image of a view k+1 to the right of the view k. The methods are described in the case of 3 views (k−1, k, k+1) situated consecutively according to an order of scanning of the views corresponding for example to successive spatial positions of the cameras that made it possible to acquire such views. The methods apply generally to the case of sequences of multi-view images having N views, N being an integer greater than 3.

FIG. 2A illustrates a method for coding a sequence of multi-view images according to a particular embodiment of the invention. An example of a coded data stream resulting from such a coding method is illustrated in a simplified manner in FIG. 5A.

Each image of a view to be coded is split up into blocks of pixels and each block of pixels is thereafter coded in a conventional manner by spatial or temporal prediction using a previously reconstructed reference image.

During a step E20, a block $B^k_c$ (in FIG. 3) of a current image $I^k_c$ of the view k, termed the current block $B^k_c$, is coded by reference to a previously coded-decoded image $I^k_{ref}$ of the view k. Step E20 is described in greater detail with the aid of FIG. 4A.

During step E20, in a conventional manner, a prediction block $pred^k$ is constructed so as to predict the current block $B^k_c$. Accordingly, a motion vector $mv^k$ of the current block $B^k_c$ is estimated in the reference image $I^k_{ref}$. The reference image $I^k_{ref}$ corresponds to an image of the view k previously coded spatially or temporally with respect to a reference image of the view k. The image $I^k_{ref}$ is thereafter decoded, i.e. reconstructed, so that it can be used as reference image to code an image of the view k or of a neighboring view k−1 or k+1. Such a reference image is inserted into a memory of reference images for the view k, denoted $DPB^k$ in FIG. 4A.

The motion vector $mv^k$ is for example estimated in a conventional manner by a "block-matching" technique aimed at determining the displacement of the current block $B^k_c$ in the reference image $I^k_{ref}$ constrained by a bitrate-distortion criterion.

The estimated motion vector $mv^k$ for the current block $B^k_c$ is thereafter coded by an entropy coding module C and inserted into the coded data stream Flx illustrated in FIG. 5A.

A prediction residual $res^k$ is obtained by calculating the difference between the current block $B^k_c$ and the prediction block $pred^k$. This prediction residual is transformed by a transformation module T implementing for example a transformation of DCT type (for Discrete Cosine Transform). The transformed coefficients of the residual block are thereafter quantized by a quantization module Q, and then coded by the entropy coding module C so as to be inserted into the coded data stream Flx illustrated in FIG. 5A. The prediction residual $res^k$ is reconstructed, by undergoing an inverse quantization by the module $Q^{-1}$ and an inverse transformation by the module $T^{-1}$ and added to the prediction block $pred^k$ to form the reconstructed current block $B^{k,k}_{rec}$. The reconstructed current block $B^{k,k}_{rec}$ is added in the DPB of the view k ($DPB^k$) so as to reconstruct the current image $I^k_c$ and so that this image can serve as reference during the coding of following images.

During a step E210, the current block $B^k_c$ is coded by reference to a previously coded-decoded image $I^{k-1}_{ref}$ of the view k−1. Step E210 is described in greater detail with the aid of FIG. 4A according to a particular embodiment of the invention.

According to a particular embodiment, during step E210, in a conventional manner, a prediction block $pred^{k-1}$ is constructed so as to predict the current block $B^k_c$ with respect to the view k−1. Accordingly, a motion vector $mv^{k-1}$ of the current block $B^k_c$ is estimated in the reference image $I^{k-1}_{ref}$. The reference image $I^{k-1}_{ref}$ corresponds to an image of the view k−1 previously coded spatially or temporally with respect to another reference image of the view k−1. The image $I^{k-1}_{ref}$ is thereafter decoded, i.e. reconstructed, so that it can be used as reference image to code an image of the view k−1 or an image of a neighboring view k or k−2. Such a reference image is inserted into a memory of reference images for the view k−1, denoted $DPB^{k-1}$ in FIG. 4A.

The motion vector $mv^{k-1}$ is representative of a displacement of the current block $B^k_c$ in the reference image $I^{k-1}_{ref}$. Such a motion vector is coded by the entropy coding module C so as to be inserted in the data stream Flx illustrated in FIG. 5A.

According to a first variant, the motion vector $mv^{k-1}$ is estimated independently of the motion vector $mv^k$ estimation performed during step E20 described hereinabove.

According to another variant, the estimation of the motion vector $mv^{k-1}$ is performed jointly with the estimation of the motion vector $mv^k$. According to this variant, the joint estimation of the motion vectors $mv^k$ and $mv^{k-1}$ is performed so as to determine the vectors $mv^k$ and $mv^{k-1}$ constrained by a bitrate-distortion criterion. According to this variant, for each motion vector $mv^k$ value tested during the motion estimation performed in the course of step E20, all the possible values of the motion vector $mv^{k-1}$ are tested, and the value of the motion vector $mv^{k-1}$ offering the best bitrate/distortion compromise is stored with the tested value of $mv^k$. Thus, at the end of the joint motion estimation, a pair of motion vectors $mv^k$, $mv^{k-1}$ is determined.

A prediction residual $res^{k-1}$ is obtained by calculating the difference between the current block $B^k_c$ and the prediction block $pred^{k-1}$. This prediction residual is transformed by the transformation module T, and then the transformed coefficients of this residual are quantized by the quantization module Q, and coded by the entropy coding module C so as to be inserted into the coded data stream Flx illustrated in FIG. 5A. The prediction residual $res^{k-1}$ is reconstructed, by undergoing an inverse quantization by the module $Q^{-1}$ and an inverse transformation by the module $T^{-1}$ and added to the prediction block $pred^{k-1}$ to form the reconstructed current block $B^{k,k-1}_{rec}$.

During a step E220, a difference information item $d^{k,k-1}$ calculated between a block associated with the view k and a block associated with the view k−1 is obtained on the basis at least of the motion vector $mv^k$ and of the motion vector $mv^{k-1}$ of the current block $B^k_c$. According to the particular mode described here, the difference information item $d^{k,k-1}$ is obtained by calculating the difference between the reconstructed blocks $B^{k,k}_{rec}$ and $B^{k,k-1}_{rec}$.

During a step E23, such an information item $d^{k,k-1}$ is coded without loss by a CSP entropy coding module, for example according to a coding mode termed "lossless" of an HEVC coder, and inserted into the coded data stream Flx illustrated in FIG. 5A.

During a step E240, the current block $B^k_c$ is coded by reference to a previously coded-decoded image $I^{k+1}_{ref}$ of the view k+1. Step E240 is similar to step E210 described hereinabove in which the index k−1 is replaced with the index k+1. Step E240 will not therefore be described in greater detail. On completion of step E240, the motion vector $mv^{k+1}$ representative of the displacement of the current block $B^k_c$ in the reference image $I^{k+1}_{ref}$ of the view k+1, as well as the prediction residual $res^{k+1}$, are inserted into the coded data stream illustrated in FIG. 5A.

During a step E250, a difference information item $d^{k,k+1}$ calculated between a block associated with the view k and a block associated with the view k+1 is obtained by calculating the difference between the reconstructed blocks $B^{k,k}_{rec}$ and $B^{k,k+1}_{rec}$.

During a step E26, such an information item $d^{k,k+1}$ is coded without loss and inserted into the coded data stream Flx illustrated in FIG. 5A.

FIGS. 2B and 4B illustrate a method for coding a sequence of multi-view images according to another particular embodiment of the invention. Only the differences with respect to the particular embodiment of the invention, described in conjunction with FIGS. 2A and 4A, are described here. An example of a coded data stream resulting from such a coding method is illustrated in a simplified manner in FIG. 5B.

During a step E211, the current block $B^k_c$ is coded by reference to a previously coded-decoded image $I^{k-1}_{ref}$ of the view k−1. Step E211 is described in greater detail with the aid of FIG. 4B.

According to this particular embodiment of the invention, during step E211, in a conventional manner, the prediction block $pred^{k-1}$ is constructed so as to predict the current block $B^k_c$ with respect to the view k−1. Accordingly, the motion vector $mv^{k-1}$ of the current block $B^k_c$ is estimated with respect to the reference image $I^{k-1}_{ref}$ included in the memory of reference images for the view k−1. The reference image $I^{k-1}_{ref}$ corresponds to an image of the view k−1 previously coded spatially or temporally with respect to another reference image of the view k−1. The image $I^{k-1}_{ref}$ is thereafter decoded, i.e. reconstructed, so that it can be used as reference image to code an image of the view k−1 or an image of a neighboring view k or k−2. Such a reference image is inserted into a memory of reference images for the view k−1, denoted $DPB^{k-1}$ in FIG. 4B.

The motion vector $mv^{k-1}$ is for example estimated in a conventional manner by a "block-matching" technique aimed at determining the displacement of the current block $B^k_c$ in the reference image $I^{k-1}_{ref}$ constrained by a bitrate-distortion criterion. The estimated motion vector $mv^{k-1}$ is representative of a displacement of the current block $B^k_c$ in the reference image $I^{k-1}_{ref}$. Such a motion vector is thereafter coded in the data stream Flx by the entropy coding module C.

In a similar manner to the embodiment described previously, the motion vector $mv^{k-1}$ can be estimated independently to the motion vector $mv^k$ or in a joint manner.

During a step E221, a difference information item $d^{k,k-1}$ calculated between a block associated with the view k and a block associated with the view k−1 is obtained on the basis at least of the motion $mv^k$ and of the motion $mv^{k-1}$ of the current block $B^k_c$. According to the particular mode described here, the difference information item $d^{k,k-1}$ is obtained by calculating the difference between the prediction blocks $pred^k$ and $pred^{k-1}$. During step E23, such an information item $d^{k,k-1}$ is coded without loss by the CSP entropy coding module, for example according to a coding mode termed "lossless" of an HEVC coder.

During a step E241, the current block $B^k_c$ is coded by reference to a previously coded-decoded image $I^{k+1}_{ref}$ of the view k+1. Step E241 is similar to step E211 described hereinabove in which the index k−1 is replaced with the index k+1. Step E241 will not therefore be described in greater detail. On completion of step E241, the motion vector $mv^{k+1}$ representative of the displacement of the current block $B^k_c$ in the reference image $I^{k+1}_{ref}$ of the view k+1 is inserted into the coded data stream illustrated in FIG. 5B.

During a step E251, a difference information item $d^{k,k+1}$ calculated between a block associated with the view k and a block associated with the view k+1 is obtained by calculating the difference between the prediction blocks $pred^k$ and $pred^{k+1}$.

During step E26, such an information item $d^{k,k+1}$ is coded without loss and inserted into the coded data stream Flx illustrated in FIG. 5B.

According to a variant of embodiment of this particular embodiment of the invention, during steps E20, E211 and E241, the prediction blocks $pred^k$, $pred^{k-1}$ and $pred^{k+1}$ are quantized before the calculation of the prediction residuals $res^k$, $res^{k-1}$ and $res^{k+1}$. Thus, the quantity of information to be coded during the calculation of $d^{k,k-1}$ and $d^{k,k+1}$ is reduced.

According to another variant of embodiment of this particular embodiment of the invention, during steps E221 and E241, a function is applied to the prediction blocks $pred^k$, $pred^{k-1}$ during the calculation of the information item $d^{k,k-1}$ representative of a difference between the view k and the view k−1 and to the prediction blocks $pred^k$, $pred^{k+1}$ during the calculation of the information item $d^{k,k+1}$ representative of a difference between the view k and the view k+1. For example, such a function may be of the form: $d^{k,k-1}=pred^k-pred^{k-1}+offset$, where offset is a value of a parameter calculated at the encoder and transmitted to the decoder. Such a parameter can be calculated at the encoder so as to minimize the cost of coding of $d^{k,k-1}$, for example by making the values of the block $d^{k,k-1}$ as close as possible to 0.

According to another example, the parameter offset may be dependent on the position of the pixel in the block. The parameter offset can then be expressed in the form Offset $(x,y)=a*x+b*y$, where $(x,y)$ are the coordinates of a pixel of the block $d^{k,k-1}$ and a and b are parameters to be transmitted to the decoder.

According to this variant of embodiment, the parameter offset according to the first example or the parameters a and b according to the second example, are coded in the coded data stream Flx, for example in a data header of the image $I^k_c$ or in a header of the sequence of images.

According to another particular embodiment of the invention, the motion vector $mv^{k+1}$, respectively $mv^{k-1}$, representative of a displacement of the current block $B^k_c$ in a reference image $I^{k+1}_{ref}$ of a view to the left, respectively $I^{k-1}_{ref}$ of a view to the right, of the current view k, is coded with the aid of a motion residual $dmv^{k+1}$, respectively $dmv^{k-1}$, illustrated in FIG. 3. The motion residuals $dmv^{k+1}$ and $dmv^{k-1}$ are obtained by:

$$dmv^{k+1}=mv^{k+1}-mv^k$$

$$dmv^{k-1}=mv^{k-1}-mv^k.$$

Thus, according to this particular embodiment, during steps E210, E211, E240 and E241, instead of coding the vectors $mv^{k+1}$ and $mv^{k-1}$, the motion residuals $dmv^{k+1}$ and $dmv^{k-1}$ are coded in the coded data stream Flx, such as illustrated by FIG. 5C.

According to this other particular embodiment of the invention, as a variant, the estimation of the motion vector $mv^{k-1}$, respectively $mv^{k+1}$, in the course of steps E210 or E211, respectively E240 or E241, is performed so as to minimize the cost of coding of the motion residual $dmv^{k-1}$, respectively $dmv^{k+1}$.

According to a variant of embodiment of the invention, the information item $d^{k,k-1}$ representative of a difference between the view k and the view k−1 is obtained by selection as a function of a bitrate-distortion criterion between a coding mode in which the information item $d^{k,k-1}$ is obtained by a difference calculated between the current block of the view k and a co-located block of the view k−1 and a coding mode in which the information item $d^{k,k-1}$ is obtained by a difference calculated between a block of the view k−1, co-located with the current block, and the current block of the view k.

According to this variant of embodiment of the invention, in the particular embodiment described in conjunction with FIGS. 2A and 4A, the information item $d^{k,k-1}$ representative of a difference between the view k and the view k−1 is calculated according to a first coding mode by $d^{k,k-1}=B^{k,k}_{rec}-B^{k,k-1}_{rec}$ and coded without losses, resulting in a coding cost $R_1$.

Next, the information item $d^{k,k-1}$ is calculated according to a second coding mode by $d^{k,k-1}=B^{k,k-1}_{rec}-B^{k,k}_{rec}$ and coded without losses, resulting in a coding cost $R_2$.

The coding mode offering the best bitrate-distortion compromise is selected to code the information item $d^{k,k-1}$. Here, the coding mode selected is the coding mode offering the lowest coding cost.

According to this variant of embodiment of the invention, in the particular embodiment described in conjunction with FIGS. 2B and 4B, the information item $d^{k,k-1}$ representative of a difference between the view k and the view k−1 is calculated according to a first coding mode by $d^{k,k-1}=pred^k-pred^{k-1}$ and coded without losses, resulting in a coding cost $R_1$.

Next, the information item $d^{k,k-1}$ is calculated according to a second coding mode by $d^{k,k-1}=pred^{k-1}-pred^k$ and coded without losses, resulting in a coding cost $R_2$.

The coding mode offering the best bitrate-distortion compromise is selected to code the information item $d^{k,k-1}$. Here, the coding mode selected is the coding mode offering the lowest coding cost.

According to this variant of embodiment, during step E23 described in conjunction with FIGS. 4A and 4B, an information item representative of the coding mode selected is coded in the coded data stream Flx so that the decoder correctly reconstructs the information item $d^{k,k-1}$.

The decoding method according to the invention is now described in conjunction with FIGS. 6A, 7A and 7B according to a particular embodiment of the invention. According to this particular embodiment of the invention, the decoding method reconstructs a multi-view video while offering a free navigation functionality on the basis of a coded data stream according to the particular embodiment illustrated in FIG. 5A.

The decoding method decodes the coded data stream image by image, and reconstructs each image block by block. The reconstructed image depends on the view requested by the user during playback. For example, at the start of the playback of the multi-view video, the user requests the display of a view k. In a conventional manner, the decoder decodes the coded data corresponding to the view k in the coded data stream Flx.

At an instant t, the DPB of the decoder therefore comprises an image $I^k_{ref}$ reconstructed previously, for example at the instant t−1, of the view k.

It is assumed here that the user does not change view between the instants t−1 and t.

For each image coded by inter-image prediction, and for each block of the current image to be reconstructed, it is verified during a step E60, whether a reference image of the view k is present in the DPB of the decoder, i.e whether a reference image of the requested view is present in the DPB of the decoder. If such is the case, during a step E61, the coded data of the current block are decoded of the stream Flx.

More precisely, and in conjunction with FIG. 7A, in a known manner, the prediction residual $res^k$ and the motion vector $mv^k$ are decoded entropically by a decoding module D. The prediction residual $res^k$ is dequantized by the inverse quantization module $Q^{-1}$ and undergoes an inverse transformation by the transformation module $T^{-1}$.

During a step E62, a prediction block $pred^k$ is constructed by the prediction module P. The prediction block $pred^k$ is obtained by motion compensation of the current block in the reference image $I^k_{ref}$ with the aid of the motion vector $mv^k$.

During a step E63, the reconstructed prediction residual $res^k$ is added to the prediction block $pred^k$ to reconstruct the current block $B^{k,k}_{rec}$ of the view k. The reconstructed current block $B^{k,k}_{rec}$ is added in the DPB so as to reconstruct the current image $I^k_c$. The current image $I^k_c$ is thereafter used as reference image during the decoding of following images of the view k or of the view k−1 or k+1.

It is now assumed that the user is in the process of viewing the view k−1 of the multi-view video sequence and requests the display of the view k at the instant t. The decoding method according to this example is described in conjunction with FIGS. 6A and 7B according to a particular embodiment of the invention.

In a conventional manner, the decoder decodes the coded data corresponding to the view k−1 in the coded data stream Flx. At an instant t, the DPB of the decoder therefore comprises an image $I^{k-1}_{ref}$ reconstructed previously, at the instant t−1, of the view k−1. The user changes view between the instants t−1 and t and requests the display of the view k at the instant t.

For each image coded by inter-image prediction, and for each block of the current image to be reconstructed $I^k_c$, it is verified during step E60, whether a reference image of the view k is present in the DPB of the decoder. If such is the case, the decoding method continues the decoding such as described previously.

In the example described here, the DPB of the decoder does not comprise the reference image of the view k. During a step E64, a motion information item $mv^{k-1}$ associated with the current block and representative of a displacement of said current block in the previously reconstructed reference image $I^{k-1}_{ref}$ is obtained on the basis of the coded data stream Flx. More precisely, the motion vector $mv^{k-1}$ is decoded by the entropy decoding module D.

During a step E650, a prediction residual information item is decoded from the coded data stream Flx. More precisely, the coded data of the prediction residual $res^{k-1}$ are decoded by the entropy decoding module D, dequantized by the inverse quantization module $Q^{-1}$ and undergo an inverse transformation by the transformation module $T^{-1}$ to reconstruct the prediction residual $res^{k-1}$.

During a step E66, a prediction block $pred^{k-1}$ is constructed by the prediction module P. The prediction block $pred^{k-1}$ is obtained by motion compensation of the current block in the reference image $I^{k-1}_{ref}$ with the aid of the motion vector $mv^{k-1}$.

During a step E67, an information item $d^{k,k-1}$ representative of a difference between the current view k−1 and the requested view k is decoded by the entropy decoding module D.

During step E68, the reconstructed prediction residual $res^{k-1}$ is added to the prediction block $pred^{k-1}$ to reconstruct the block $B^{k,k-1}_{rec}$. Next, the information item $d^{k,k-1}$ is added to the reconstructed block $B^{k,k-1}_{rec}$ to reconstruct the current block $B^{k,k}_{rec}$. The reconstructed current block $B^{k,k}_{rec}$ is then added in the DPB so as to reconstruct the current image $I^k_c$. The current image $I^k_c$ is thereafter used as reference image during the decoding of following images of the view k or of the view k−1 or k+1.

The decoding method is now described in conjunction with FIGS. 6B, 7A and 7C according to another particular embodiment of the invention.

According to this particular embodiment of the invention, the coded data stream Flx is that illustrated in FIG. 5B. It is assumed in this example that the user is in the process of viewing the view k−1 of the multi-view video sequence and requests the display of the view k at the instant t.

In a conventional manner, the decoder decodes the coded data corresponding to the view k−1 in the coded data stream Flx. At an instant t, the DPB of the decoder therefore comprises an image $I^{k-1}_{ref}$ reconstructed at the instant t−1, of the view k−1. The user changes view between the instants t−1 and t and requests the display of the view k at the instant t.

For each image coded by inter-image prediction, and for each block of the current image to be reconstructed $I^k_c$, it is verified during step E60, whether a reference image of the view k is present in the DPB of the decoder. If such is the case, the decoding method continues the decoding such as described hereinabove in conjunction with FIGS. 6A and 7A.

In the example described here, the DPB of the decoder does not comprise the reference image of the view k. During a step E64, a motion information item $mv^{k-1}$ associated with the current block and representative of a displacement of the current block in the previously reconstructed reference image $I^{k-1}_{ref}$ is obtained on the basis of the coded data stream Flx. More precisely, the motion vector $mv^{k-1}$ is decoded by the entropy decoding module D.

During a step E651, a prediction residual information item is decoded from the coded data stream Flx. More precisely, the coded data of the prediction residual $res^k$ are decoded by the entropy decoding module D, dequantized by the inverse quantization module $Q^{-1}$ and undergo an inverse transformation by the transformation module $T^{-1}$ to reconstruct the prediction residual $res^k$. According to this particular embodiment of the invention, the reconstructed prediction residual $res^k$ corresponds to the same prediction residual which would have been decoded if the reference image of the view k had been included in the DPB. Stated otherwise, this prediction residual $res^k$ is the prediction residual calculated on coding as the difference between the current block $B^k_c$ to be coded and the prediction block $pred^k$ obtained on the basis of the reference image $I^k_{ref}$ of the view k.

During a step E66, the prediction block $pred^{k-1}$ is constructed by the prediction module P. The prediction block $pred^{k-1}$ is obtained by motion compensation of the current block in the reference image $I^{k-1}_{ref}$ with the aid of the motion vector $mv^{k-1}$.

During step E67, the information item $d^{k,k-1}$ representative of a difference between the current view k−1 and the requested view k is decoded by the entropy decoding module D.

During step E68, the reconstructed prediction residual $res^{k-1}$ and the information item $d^{k,k-1}$ are added to the prediction block $pred^{k-1}$ to reconstruct the current block $B^{k,k}_{rec}$. The reconstructed current block $B^{k,k}_{rec}$ is then added in the DPB so as to reconstruct the current image $I^k_c$. The current image $I^k_c$ is thereafter used as reference image during the decoding of following images of the view k or of the view k−1 or k+1.

According to a variant of embodiment of this particular embodiment of the invention, on coding, the prediction blocks $pred^k$, $pred^{k-1}$ have undergone a quantization before the calculation of the prediction residual $res^k$ and of the difference information item $d^{k,k-1}$.

According to this variant, in the course of the decoding of the multi-view sequence, during steps E66 and E62, the prediction blocks $pred^k$, $pred^{k-1}$ then undergo an inverse quantization, for example via the inverse quantization module $Q^{-1}$.

According to another variant of embodiment of this particular embodiment of the invention, on coding, a function has been applied to the prediction blocks $pred^k$, $pred^{k-1}$ during the calculation of the information item $d^{k, k-1}$ representative of a difference between the view k and the view k−1.

According to an example of this variant of embodiment, the function applied is of the form $pred^k - pred^{k-1} + offset$. In the course of the decoding of the multi-view sequence, the parameter offset is decoded on the basis of the coded data stream, for example in a data header of the image $I^k_c$ or in a header of the sequence of images. During step E67, the decoded parameter offset is then subtracted from the decoded information item $d^{k,k-1}$.

According to another example of this variant of embodiment, the function applied is of the form $d^{k, k-1}(x,y) = pred^k(x,y) - pred^{k-1}(x,y) + offset(x,y)$, with $offset(x,y) = a*x + b*y$, where (x,y) corresponds to the coordinates of a pixel of the block $d^{k,k-1}$. In the course of the decoding of the multi-view sequence, the parameters a and b of the function offset(x,y) are decoded on the basis of the coded data stream, for example in a data header of the image $I^k_c$ or in a header of the sequence of images. During step E67, the parameter $offset(x,y) = a*x + b*y$ is then subtracted from the decoded information item $d^{k,k-1}(x,y)$.

According to another particular embodiment of the invention, the motion vector $mv^{k-1}$, representative of a displacement of the current block $B^k_c$ in the reference image $I^{k-1}_{ref}$ of the view k−1, is coded in the form of a motion residual $dmv^{k-1}$, as illustrated in FIG. 5C. As illustrated in FIG. 3, the motion residual $dmv^{k-1}$ is representative of a displacement of a reference block $B^{k-1}_{t-1}$ of the current block $B^k_c$ in the reference image $I^k_{ref}$ of the view k. The reference block $B^{k-1}_{t-1}$ corresponds here to the current block $B^k_c$ displaced in the reference image $I^{k-1}_{ref}$ of the view k−1 by the motion vector $mv^{k-1}$. According to this particular embodiment, during step E64, the motion residual $dmv^{k-1}$ and the motion vector $mv^k$ are decoded by the decoding module D. The motion vector $mv^k$ corresponds to the motion vector calculated for the current block $B^k_c$ with respect to the reference image $I^k_{ref}$ of the view k and coded during the coding of the current block $B^k_c$ with respect to the view k. During step E64, the motion vector $mv^{k-1}$ is then obtained by: $mv^{k-1} = dmv^{k-1} + mv^k$.

According to a variant of embodiment of the invention, during step E67 described in conjunction with FIGS. 6A and 6B, an information item representative of a mode of coding of the information item $d^{k,k-1}$ representative of a difference between the view k and the view k−1 is decoded on the basis of the coded data stream Flx.

According to this variant of embodiment of the invention, and according to the particular embodiment described in conjunction with FIGS. 6A and 7B, the decoded coding mode makes it possible to reconstruct the current block according to a first mode of coding of $d^{k,k-1}$ by $B^{k,k}_{rec} = B^{k,k-1}_{rec} + d^{k,k-1}$, or according to a second mode of coding of $d^{k,k-1}$, by $B^{k,k}_{rec} = B^{k,k-1}_{rec} - d^{k,k-1}$.

According to this variant of embodiment of the invention, and according to the particular embodiment described in conjunction with FIGS. 6B and 7C, the decoded coding mode makes it possible to reconstruct the current block according to a first mode of coding of $d^{k,k-1}$ by $B^{k,k}_{rec} = pred^{k-1} + d^{k,k-1} + res^k$, or according to a second mode of coding of $d^{k,k-1}$, by $B^{k,k}_{rec} = pred^{k-1} - d^{k,k-1} + res^k$.

The decoding method has been described hereinabove in the case of changing from a current view k−1 to a requested view k. The particular embodiments of the invention for decoding a multi-view video sequence when changing from a current view k+1 to the requested view k are similar.

The decoding method described hereinabove assumes that the decoder has at its disposal the coded data of the multi-view video sequence for all the views of the sequence, and the additional data making it possible to change view from any view k to a following view k−1 to the left, or to a following view k+1 to the right.

The decoding method also applies to the case where only the coded data of the stream which are necessary for displaying the requested view are transmitted to the decoder. Stated otherwise, the decoder can communicate with a server to obtain the coded data of the current view, and if necessary additional data of change of view when the user requests such a change of view.

FIG. 8 presents the simplified structure of a coding device COD adapted to implement the coding method according to any one of the previously described particular embodiments of the invention.

Such a coding device comprises a memory MEM, a processing unit UT, equipped for example with a processor PROC, and driven by the computer program PG stored in memory MEM. The computer program PG comprises instructions for implementing the steps of the coding method such as was described previously, when the program is executed by the processor PROC.

On initialization, the code instructions of the computer program PG are for example loaded into a RAM memory (not represented) before being executed by the processor PROC. The processor PROC of the processing unit UT implements in particular the steps of the coding method which is described in conjunction with FIGS. 2A, 2B and 4A-B, according to the instructions of the computer program PG.

According to a particular embodiment of the invention, the coding device comprises a communication interface COM allowing in particular the coding device to transmit a coded data stream representative of a multi-view video sequence, via a communication network.

According to a particular embodiment of the invention, the coding device described previously is included in a terminal.

FIG. 9 presents the simplified structure of a decoding device DEC adapted to implement the decoding method according to any one of the previously described particular embodiments of the invention.

Such a decoding device comprises a memory MEM0, a processing unit UT0, equipped for example with a processor PROC0, and driven by the computer program PG0 stored in memory MEM0. The computer program PG0 comprises instructions for implementing the steps of the decoding method such as was described previously, when the program is executed by the processor PROC0.

According to a particular embodiment of the invention, the decoding device DEC comprises a communication interface COM0 allowing in particular the decoding device to receive a coded data stream representative of a multi-view video sequence, via a communication network.

On initialization, the code instructions of the computer program PG0 are for example loaded into a RAM memory (not represented) before being executed by the processor PROC0. The processor PROC0 of the processing unit UT0 implements in particular the steps of the decoding method which is described in conjunction with FIGS. 6A, 6B and 7A-C, according to the instructions of the computer program PG0. The memory MEM0 is adapted to store at least one reconstructed reference image of a previously decoded view and at least one image of another view reconstructed on the basis of the reconstructed reference image of the previously decoded view, the other view being different from the previously decoded view.

According to a particular embodiment of the invention, the decoding device described previously is included in a terminal.

Although the present disclosure has been described with reference to one or more examples, workers skilled in the art will recognize that changes may be made in form and detail without departing from the scope of the disclosure and/or the appended claims.

The invention claimed is:

1. A decoding method comprising:
   decoding a coded data stream representative of a video comprising at least one first view and one second view different from the first view, implemented by a decoding device, said first view having been coded by inter-view prediction with respect to said second view and by temporal prediction with respect to a previously reconstructed reference image of the first view, and said second view having been coded by temporal prediction with respect to a previously reconstructed reference image of the second view, said decoding device comprising a memory comprising said at least one said previously reconstructed reference image of the second view at a time before a current time of decoding, said memory not comprising said previously reconstructed reference image of the first view at a time before the current time of decoding, the decoding comprising, for at least one block of a current image of the first view, termed a current block:
   obtaining, on the basis at least of the coded data stream, a motion information item associated with said current block, said motion information item being representative of a displacement of said current block in said previously reconstructed reference image of the second view,
   decoding, on the basis of the coded data stream, a prediction residual information item,
   decoding, on the basis of the coded data stream, a difference information item representative of a difference between the first view and the second view,
   obtaining a prediction block of the reference image of the second view on the basis of said reference image of said second view and of said motion information item obtained, and
   reconstructing said current block on the basis of said obtained prediction block, of said decoded prediction residual information item and of said decoded difference information item.

2. The decoding method as claimed in claim 1, in which said prediction residual information item corresponds to a residual obtained on the basis of the motion information item associated with said current block and of said previously reconstructed reference image of said second view.

3. The decoding method as claimed in claim 1, in which said prediction residual information item corresponds to a prediction residual obtained on the basis of a motion information item representative of a displacement of said current block in a reference image of the first view and of said reference image of said first view.

4. The decoding method as claimed in claim 3, in which the obtaining of said prediction block further comprises a step of inverse quantization of a block obtained on the basis of said motion information item obtained and of said previously reconstructed reference image of said second view.

5. The decoding method as claimed in claim 3, in which the reconstruction of said at least one block of said current image of the first view on the basis of said prediction block, of said prediction residual information item and of said difference information item calculated between the first block associated with the first view and the second block associated with the second view comprises the application of a function to said prediction block and to said difference information item.

6. The decoding method as claimed in claim 5, further comprising decoding an information item representative of said function.

7. The decoding method as claimed in claim 1, in which the first view is a previous or following view of the second view according to a predetermined position of the views in the video.

8. The decoding method as claimed in claim 1, in which the obtaining of said motion information item associated with said current block comprises:
   decoding a first motion information item representative of a displacement in the previously reconstructed reference image of the second view of a reference block of said current block, said reference block corresponding to said current block displaced in a reference image of the first view,
   decoding a second motion information item representative of a displacement of said current block in said reference image of the first view,
   adding the first and of the second motion information item.

9. A device for decoding a coded data stream representative of a video comprising at least one first view and one second view different from the first view, said first view having been coded by inter-view prediction with respect to said second view and by temporal prediction with respect to a previously reconstructed reference image of the first view, and said second view having been coded by temporal predication with respect to a previously reconstructed reference image of the second view, said decoding device comprising:
   a processor; and
   at least one non-transitory computer-readable medium comprising at least one previously reconstructed reference image of the second view at a time before a current time of decoding, said medium not comprising a previously reconstructed reference image of the first view at a time before the current time of decoding, and program code instructions, which when executed by the processor configure the decoding device to, for at least one block of a current image of the first view, termed a current block:
   obtain, on the basis at least of the coded data stream, a motion information item associated with said current block, said motion information item being representative of a displacement of said current block in said previously reconstructed reference image of the second view,
   decode, on the basis of the coded data stream, a prediction residual information item,
   decode, on the basis of the coded data stream, a difference information item representative of a difference between the first view and the second view,
   obtain a prediction block of the reference image of the second view on the basis of said previously reconstructed reference image of said second view and of said motion information item obtained, and reconstruct said current block on the basis of said obtained prediction block, of said decoded prediction residual information item and of said decoded difference information item.

10. A method comprising:

coding, with a coding device, a video comprising at least one first view and one second view different from the first view, the coding comprising, for at least one block of a current image of said first view, termed a current block:

coding said current block by temporal prediction with respect to a previously coded-decoded image of the first view, delivering a first motion information item representative of a displacement of said current block in the previously coded-decoded image of the first view and a prediction residual information item, coding said current block by inter-view prediction with respect to an image of the second view which has been previously coded-decoded by temporal prediction with respect to a previously reconstructed reference image of the second view, delivering at least one second motion information item representative of a displacement of said current block in the previously coded-decoded image of the second view, obtaining a difference information item calculated between the first view and the second view, on the basis at least of the first motion information item and of the second motion information item, and coding without loss said obtained difference information item.

11. The coding method as claimed in claim 10, in which said difference information item calculated between the first block associated with the first view and the second block associated with the second view is obtained by selecting a mode from among the following modes, as a function of a bitrate-distortion criterion:

coding a signal representative of a difference between the block associated with the first view and the block associated with the second view, coding a signal representative of a difference between said block associated with the second view and said block associated with the first view, said coding method comprising coding an information item representative of the mode selected.

12. A device for coding a video comprising at least one first view and one second view different from the first view, the coding device comprising:

a processor; and at least one non-transitory computer-readable medium program code instructions stored thereon, which when executed by the processor configure the coding device to, for at least one block of a current image of said first view, termed a current block:

code said current block by temporal prediction with respect to a previously coded-decoded image of the first view, delivering a first motion information item representative of a displacement of said current block in the previously coded-decoded image of the first view and a prediction residual information item, code said current block by inter-view prediction with respect to an image of the second view which has been previously coded-decoded by temporal predication with respect to a previously reconstructed reference image of the second view, delivering at least one second motion information item representative of a displacement of said current block in the previously coded-decoded image of the second view, obtain a difference information item calculated between the first view and the second view, on the basis at least of the first motion information item and of the second motion information item, and code without loss said obtained difference information item.

13. A non-transitory computer-readable recording medium on which is recorded a computer program comprising program code instructions for execution of a decoding method, when said program is executed by a processor of a decoding device, wherein the instructions configure the decoding device to:

decode a coded data stream representative of a video comprising at least one first view and one second view different from the first view, said first view having been coded by inter-view predication with respect to said second view and by temporal predication with respect to a previously reconstructed reference image of the first view, and said second view having been coded by temporal prediction with respect to a previously reconstructed reference image of the second view, said decoding device comprising a memory comprising at least one previously reconstructed reference image of the second view at a time before a current time of decoding, said memory not comprising a previously reconstructed reference image of the first view at a time before a current time of decoding, the decoding comprising, for at least one block of a current image of the first view, termed a current block:

obtaining, on the basis at least of the coded data stream, a motion information item associated with said current block, said motion information item being representative of a displacement of said current block in said previously reconstructed reference image of the second view, decoding, on the basis of the coded data stream, a prediction residual information item, decoding, on the basis of the coded data stream, a difference information item representative of a difference between the first view and the second view, obtaining a prediction block of the reference image of the second view on the basis of said previously reconstructed reference image of said second view and of said motion information item obtained, and reconstructing said current block on the basis of said obtained prediction block, of said decoded prediction residual information item and of said decoded difference information item.

14. A non-transitory computer-readable recording medium on which is recorded a computer program comprising program code instructions for execution of a coding method, when said program is executed by a processor of a coding device, wherein the instructions configure the coding device to:

code a video comprising at least one first view and one second view different from the first view, the coding comprising, for at least one block of a current image of said first view, termed a current block:

coding said current block by temporal prediction with respect to a previously coded-decoded image of the first view, delivering a first motion information item representative of a displacement of said current block in the previously coded-decoded image of the first view and a prediction residual information item, coding said current block by inter-view prediction with respect to an image of the second view which has been previously coded-decoded by temporal prediction with respect to a previously reconstructed reference image of the second view, delivering at least one second motion information item representative of a displacement of said current block in the previously coded-decoded image of the second view, obtaining a difference information item calculated between the first view the second view, on the basis at least of the first motion information item and of the second motion information item, and coding without loss said obtained difference information item.

* * * * *